(12) United States Patent
Saito (10) Patent No.: US 7,417,763 B2
(45) Date of Patent: Aug. 26, 2008

(54) DATA PROCESSING APPARATUS AND METHOD, AND IMAGE PROCESSING APPARATUS

(75) Inventor: Kazuhiro Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1003 days.

(21) Appl. No.: 10/461,484

(22) Filed: Jun. 16, 2003

(65) Prior Publication Data

US 2003/0234946 A1 Dec. 25, 2003

(30) Foreign Application Priority Data

Jun. 20, 2002 (JP) ............................. 2002-180058

(51) Int. Cl.
H04N 1/60 (2006.01)
G06K 15/00 (2006.01)
G06K 9/00 (2006.01)
(52) U.S. Cl. .................. 358/1.9; 358/523; 358/504; 358/3.23; 382/162; 382/167
(58) Field of Classification Search .................. 358/1.9, 358/518, 525, 523, 520, 504, 500, 529–530, 358/3.23; 382/162, 167–170, 165
See application file for complete search history.

(56) References Cited

U.S. PATENT DOCUMENTS

| | | | | |
|---|---|---|---|---|
| 5,594,557 A | * | 1/1997 | Rolleston et al. | ............. 358/518 |
| 5,911,003 A | * | 6/1999 | Sones | .......................... 382/162 |
| 6,339,485 B1 | * | 1/2002 | Yamada | ...................... 358/504 |
| 6,381,037 B1 | * | 4/2002 | Balasubramanian et al. | ......................... 358/3.23 |
| 6,396,595 B1 | * | 5/2002 | Shimazaki | .................. 358/1.9 |
| 6,441,923 B1 | * | 8/2002 | Balasubramanian et al. | ......................... 358/3.23 |
| 6,853,464 B1 | * | 2/2005 | Ueda et al. | .................... 358/1.9 |
| 6,873,433 B1 | * | 3/2005 | Statt | ........................... 358/1.9 |
| 2002/0021458 A1 | | 2/2002 | Saito et al. | ................... 358/515 |
| 2002/0031258 A1 | * | 3/2002 | Namikata | ................... 382/165 |
| 2003/0001918 A1 | * | 1/2003 | Tsuchiya et al. | .............. 347/19 |
| 2003/0076516 A1 | | 4/2003 | Saito | .......................... 358/1.9 |
| 2003/0202197 A1 | | 10/2003 | Saito et al. | ................... 358/1.9 |

FOREIGN PATENT DOCUMENTS

| | | |
|---|---|---|
| JP | 10-322563 | 12/1998 |
| JP | 11-331627 | 11/1999 |
| JP | 2001-320594 | 11/2001 |
| JP | 2002-152529 | 5/2002 |

\* cited by examiner

*Primary Examiner*—Kimberly Williams
*Assistant Examiner*—Charlotte M Baker
(74) *Attorney, Agent, or Firm*—Fitzpatrick, Cella, Harper & Scinto (57) ABSTRACT

A method of reconstructing the content of an ink color decomposition table is available as a method calibrating second- and higher-order colors. However, it is difficult to reconstruct the ink color decomposition table while maintaining a limitation upon the overall amount of ink allowed by the printing paper. Accordingly, a printer is made to form a color patch that corresponds to the signal value of a color to be calibrated, the signal value is calibrated based upon the measured color value of the color patch formed and a target value that corresponds to the signal value of the color to be calibrated, and multidimensional table data for calibration is created based upon the measured color value of the color patch formed.

14 Claims, 9 Drawing Sheets

DATA PROCESSING APPARATUS AND METHOD, AND IMAGE PROCESSING APPARATUS

FIELD OF THE INVENTION

This invention relates to a data processing apparatus and method and to an image processing apparatus. More particularly, the invention relates to calibration for the purpose of limiting fluctuation of color reproduction characteristics.

BACKGROUND OF THE INVENTION

Figure 1:
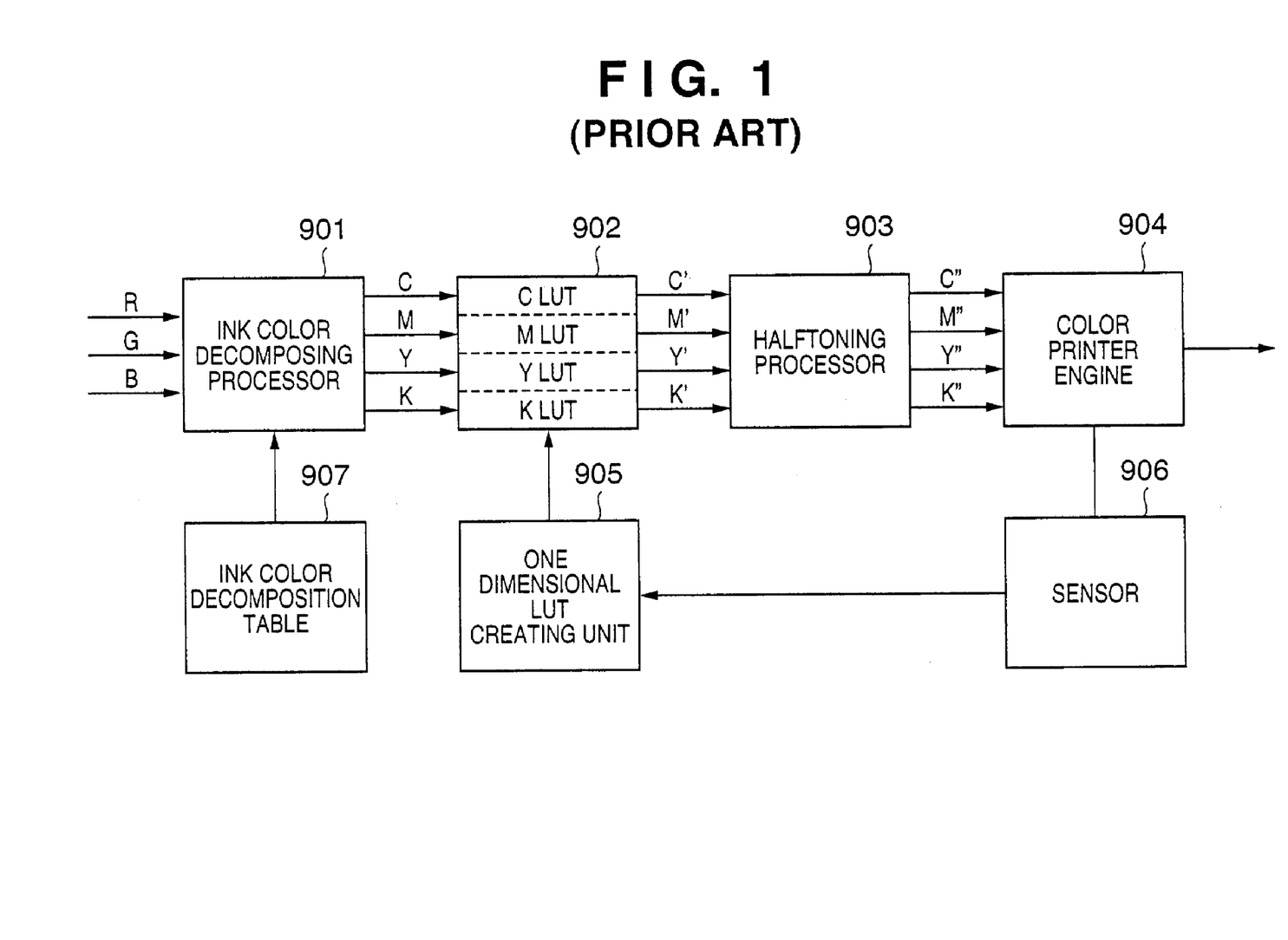
FIG. 1 is a block diagram useful in describing a color-printer calibration technique.

FIG. 1 is a diagram useful in describing a technique for calibrating a color printer.

As shown in FIG. 1, an ink color decomposing processor 901 decomposes multivalued RGB image data, which is input thereto, into data of the color components C (cyan), M (magenta), Y (yellow) and K (black) corresponding to the colors of the colorants (referred to as "ink colors" below) of the color printer by interpolation processing such as tetrahedral interpolation based upon table information in an ink color decomposition table 907.

A one-dimensional LUT 902 for calibration purposes corrects the grayscale characteristic of the image data in accordance with the color reproduction characteristic of the printer. Specifically, the LUT 902 corrects the multivalued CMYK data that is output from the ink color decomposing processor 901 to multivalued C'M'Y'K' data. A calibration conforming to the characteristic of the color printer is achieved by this processing.

A halftoning processor 903 converts the multivalued C'M'Y'K' data to a number of tones capable of being printed by the color printer. If the color printer is, e.g., a binary printer, then the C'M'Y'K' data is binarized by the halftoning processing, whereby the processor 903 outputs binary C"M"Y"K" data.

A color printer engine 904 performs printing based upon the C"M"Y"K" data input thereto.

A sensor 906 investigates the color reproduction characteristic of the color printer engine 904. On the basis of the color reproduction characteristic of each of the colors CMYK output from the sensor 906, a one-dimensional LUT creating unit 905 creates a one-dimensional LUT of each of the colors CMYK in such a manner that a target color reproduction characteristic will be obtained. The result of this operation is written to the one-dimensional LUT 902.

The technique using the one-dimensional LUT 902 shown in FIG. 1 calibrates each of the colors CMYK independently and therefore implements a highly accurate calibration with regard to first-order colors (ink colors). However, a highly accurate calibration cannot be achieved with regard to colors other than first-order colors, such as the second-order colors R (red), G (green) and B (blue), and the third- and fourth-order colors, which form a gray line.

A method of calibrating second- and higher-order colors by reconstructing the content of the ink color decomposition table 907 is available as a method calibrating second-, third- and fourth-order colors, etc. However, it is difficult to reconstruct the ink color decomposition table 907 while maintaining a limitation upon the overall amount of ink allowed by the printing paper.

Furthermore, since the latest ink-jet printers employ a six-color ink system that uses light cyan and light magenta in addition to cyan, magenta, yellow and black (the conventional first-order colors) as the ink colors, it is even more difficult to maintain the above-mentioned limitation. The same holds true for other printers such as electrophotographic printers as well.

SUMMARY OF THE INVENTION

Accordingly, an object of the present invention is to solve the above-mentioned problems individually or collectively and create a multidimensional table for calibration taking second- and higher-order colors into consideration.

Another object of the present invention is to stabilize the tint of second- and higher-order colors easily and in a short period of time.

According to the present invention, the foregoing object is attained by providing a data processing apparatus for generating multidimensional table data, which is for subjecting image data to a color transformation, comprising a former arranged to cause a printer to form a color patch that corresponds to a signal value of a color to be calibrated; a sensor arranged to measure the color of the color patch formed; a corrector arranged to correct the signal value based upon result of color measurement by the sensor and a target value that corresponds to the signal value of the color to be calibrated; and a generator arranged to generate the multidimensional table data for calibration based upon the measured value of the color patch formed.

Further, according to the present invention, the foregoing object is attained by providing an image processing apparatus, wherein image data is subjected to a color transformation using multidimensional table data generated by the above data processing apparatus.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An image processing apparatus according to an embodiment of the present invention will be described in detail with reference to the drawings.

[Structure]

Figure 2:
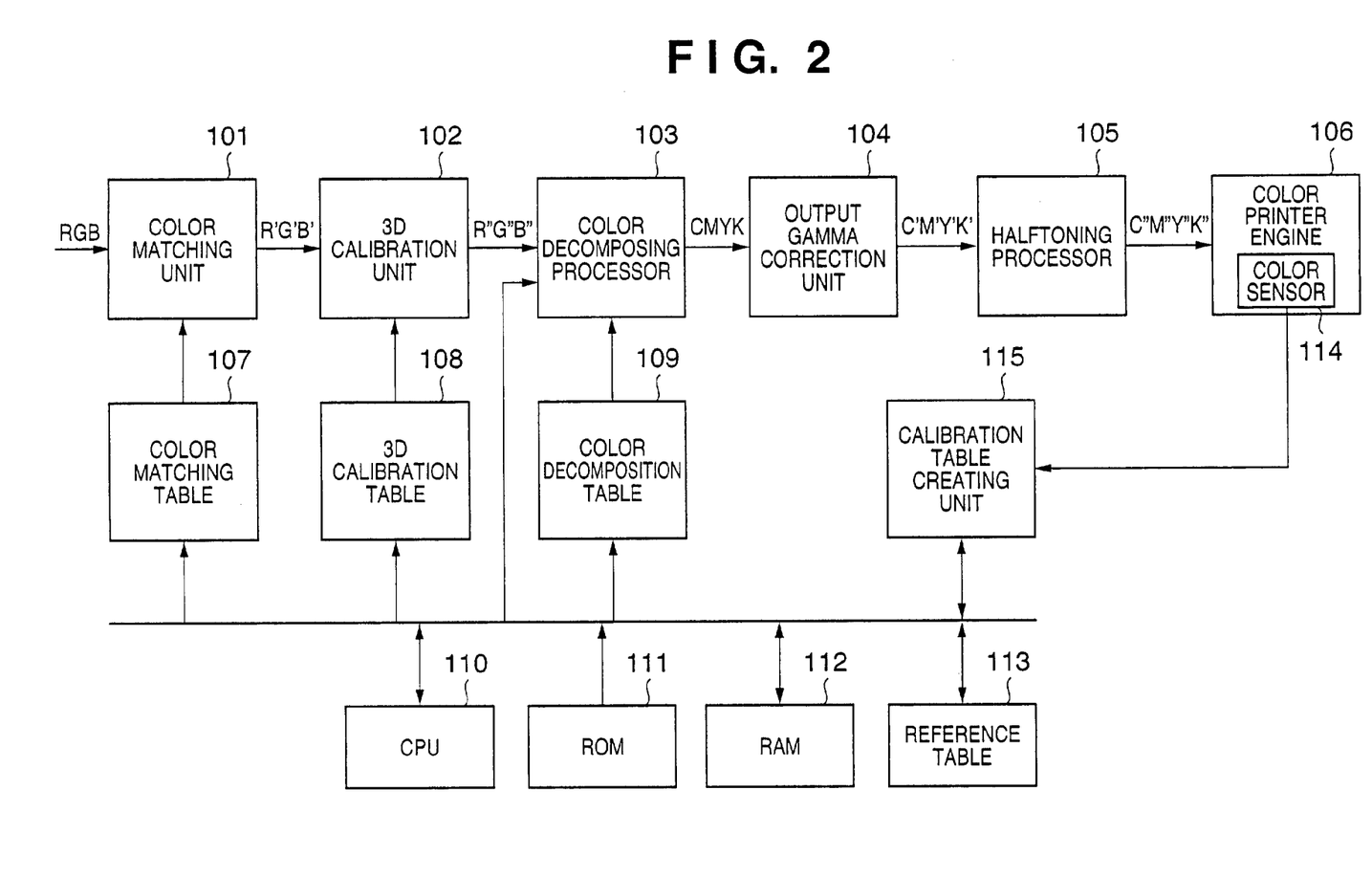
FIG. 2 is a block diagram illustrating the structure of an image processing apparatus according to an embodiment of the present invention.

FIG. 2 is a block diagram illustrating the structure of an image processing apparatus according to an embodiment of the invention.

As shown in FIG. 2, a color matching unit 101 applies color matching processing to RGB data to effect a color transformation to R'G'B' data by three-dimensional interpolation processing such as tetrahedral interpolation or cubic interpolation, which is based upon the content of a color matching table 107, in order to match the color of input image data and the color reproduction characteristic of a printer.

A 3D calibration unit 102 applies calibration processing to the R'G'B' data to effect a color transformation to R"G"B" data by three-dimensional interpolation processing such as tetrahedral interpolation or cubic interpolation based upon the content of a 3D calibration table 108.

A color decomposing processor 103 executes color decomposition processing, which transforms the R"G"B" data to CMYK data representing the colorants (referred to as "ink colors" below) of the printer, by three-dimensional interpolation processing such as tetrahedral interpolation or cubic interpolation based upon the content of a color decomposition table 109.

An output gamma correction unit 104 corrects the gamma characteristic based upon a combination of the content of processing by a halftoning processor 105 and the characteristic of a color printer engine 106.

The halftoning processor 105 executes halftoning processing in order to transform the C'M'Y'K' multivalued data, which is output from the output gamma correction unit 104, to a number of tones capable of being expressed by the color printer engine 106.

The color printer engine prints an image on printing paper based upon C"M"Y"K" data that is output from the halftoning processor 105.

On the basis of a program and data stored in a ROM 111, a CPU 110 controls the overall image processing apparatus using a RAM 112 as a working area, thereby controlling execution of processing for updating the 3D calibration table 108 and execution of image processing using the 3D calibration table 108 that has been updated.

The corresponding relationship between the R"G"B" data, which forms a patch described later, and a calorimetric value of the formed patch is stored in a reference table 113.

A color sensor 114, which is mounted within the color printer engine 106, measures the color of the color patch printed by the color printer engine 106. A calibration table creating unit 115 retains the result of colorimetry performed by the color sensor 114. The result of colorimetry may be stored in the RAM 112 if the RAM 112 has enough storage capacity.

This embodiment is such that by updating the content of the 3D calibration table 108, the tint of a printout can be stabilized in simple fashion for second or higher-order colors without requiring limitation of the overall amount of ink in a case where the content of the color decomposition table 109 is changed, and without requiring complicated control of a six-color ink system or the like.

[Method of creating 3D calibration table]

Figure 3:
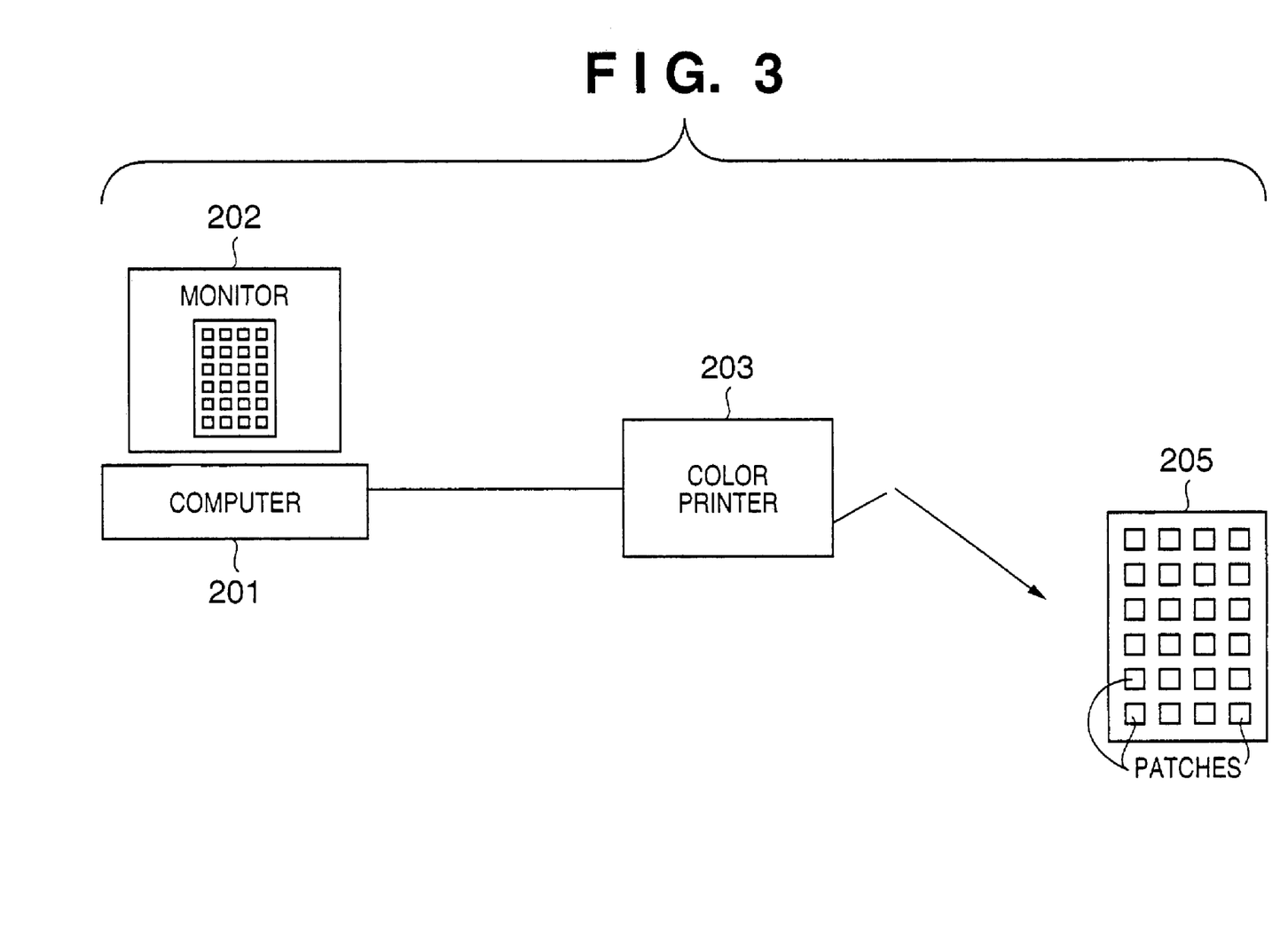
FIG. 3 is a diagram useful in describing a method of creating a 3D calibration table.

FIG. 3, which is a diagram useful in describing a method of creating the 3D calibration table 108, illustrates the configuration of a system that includes a color printer.

As shown in FIG. 3, a computer 201 controls a color printer 203 for printing an image. A monitor 202 displays data and the like held in the computer 201. It should be noted that the image processing apparatus of this embodiment shown in FIG. 2 is mounted within a color printer 203.

Figure 4:
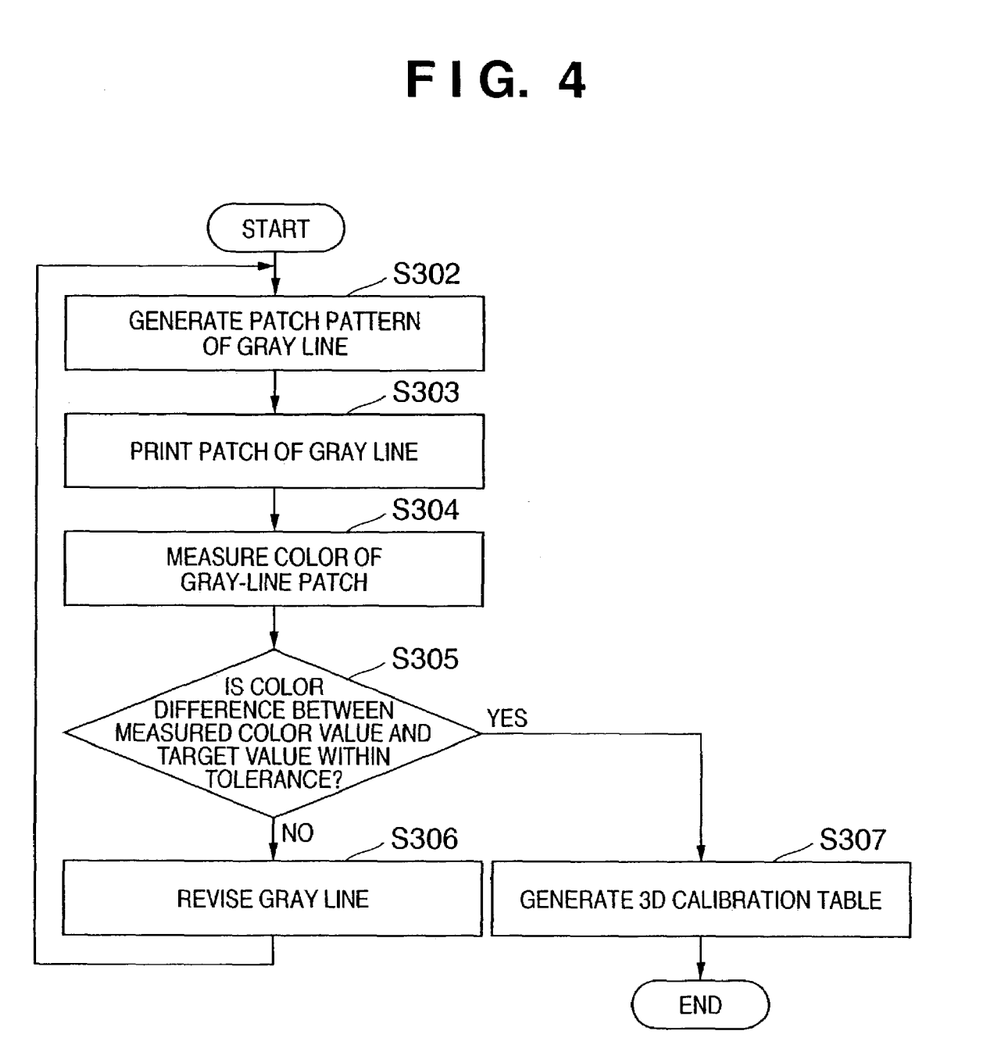
FIG. 4 is a flowchart for describing calibration.

FIG. 4 is a flowchart useful in describing calibration executed in the system of FIG. 3 under the control of the computer 201.

First, on the basis of the reference table 113, the CPU 110 generates R"G"B" data that corresponds to a patch pattern of a gray line (S302). Next, the R"G"B" data that has been generated is processed by the color decomposing processor 103, output gamma correction unit 104 and halftoning processor 105, and a patch pattern 205 of the gray line is printed by the color printer 203 (S303). Each patch of the patch pattern 205 printed undergoes colorimetry by the color sensor 114, and the result of colorimetry is retained in the calibration table creating unit 115 (S304).

The CPU 101 calculates a color difference $\Delta E$ between the colorimetry value of each patch retained in the calibration table creating unit 115 and a target value (of the calorimetric value) of the gray line stored in the reference table 113, and determines whether the color difference $\Delta E$ falls within a tolerance $\epsilon$ (S305). If $\Delta E > \epsilon$ holds, the CPU 101 revises the gray line (S306). The details are set forth below.

The processing of steps S302 to S304 is repeated using the R"G"B" data, which was revised at step S306, until the relation $\Delta E \leq \epsilon$ is established. When $\Delta E \leq \epsilon$ is established, a 3D calibration table is generated by three-dimensional interpolation using the R"G"B" data of the gray line prevailing at this time (S307).

Figure 5:
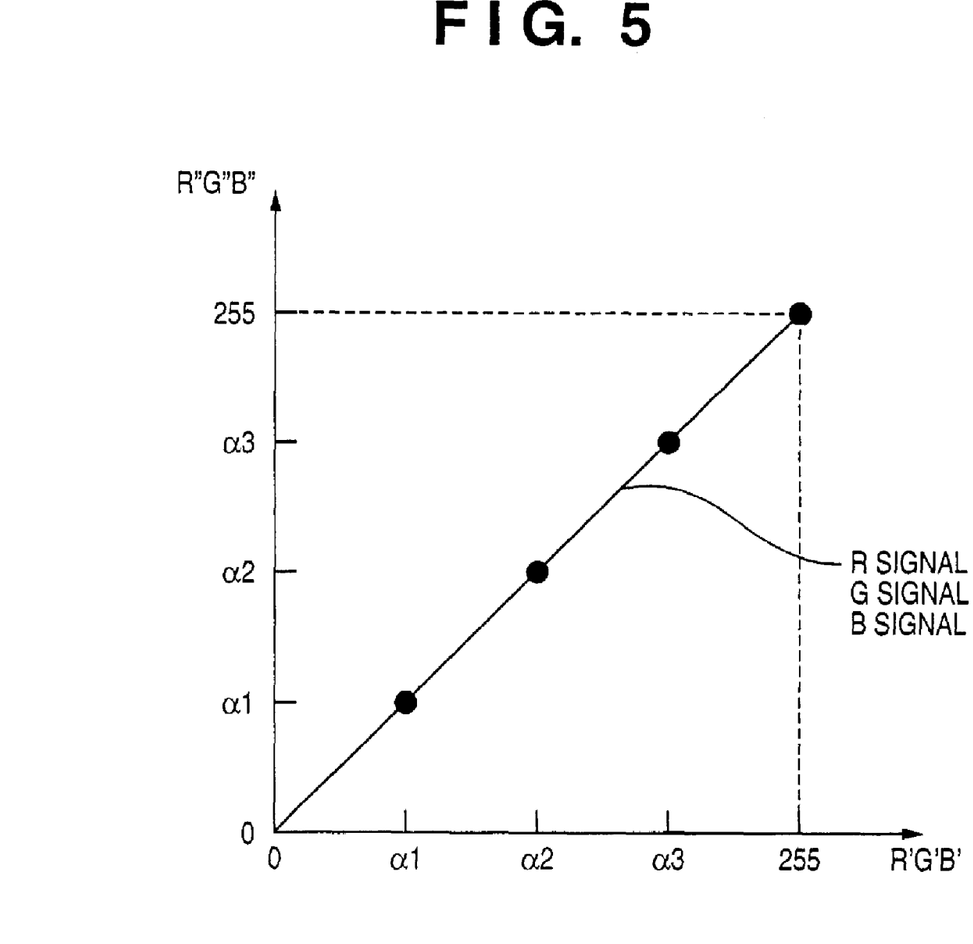
FIG. 5 is a graph illustrating the initial characteristics of the gray line of a 3D calibration table.

FIG. 5 is a graph illustrating the initial characteristics of the gray line of the 3D calibration table 108. Specifically, according to the initial characteristics shown in FIG. 5, the characteristic curves of R, G and B all overlap, and the output values of R", G" and B" corresponding to input values $\alpha 1$, $\alpha 2$ and $\alpha 3$ of R", G" and B" are $\alpha 1$, $\alpha 2$ and $\alpha 3$, respectively.

Figure 6:
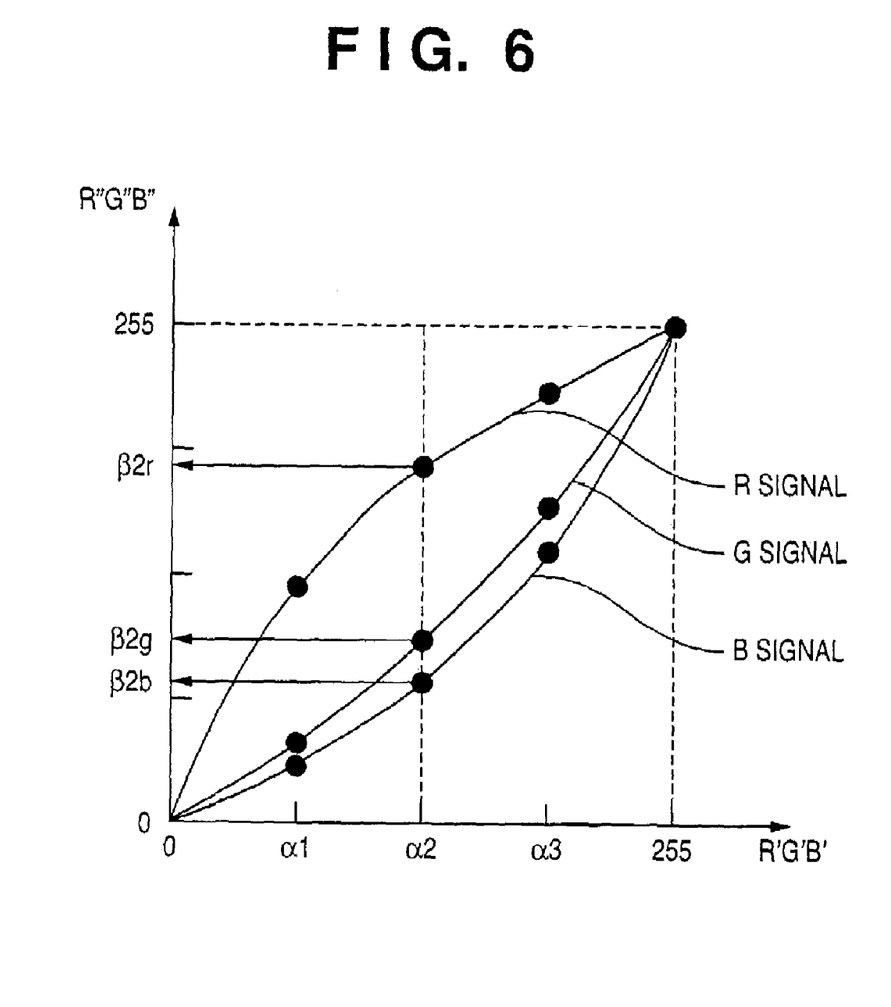
FIG. 6 is a graph illustrating a revised gray line of a 3D calibration table.

FIG. 6, on the other hand, illustrates the characteristics of the revised gray line of the 3D calibration table 108. In FIG. 6, the result is such that the R signal is emphasized and the G and B signals de-emphasized in comparison with the initial characteristics (FIG. 5). The end result is that the color reproduction characteristic of the gray line of the color printer 203 is stabilized.

Figure 7:
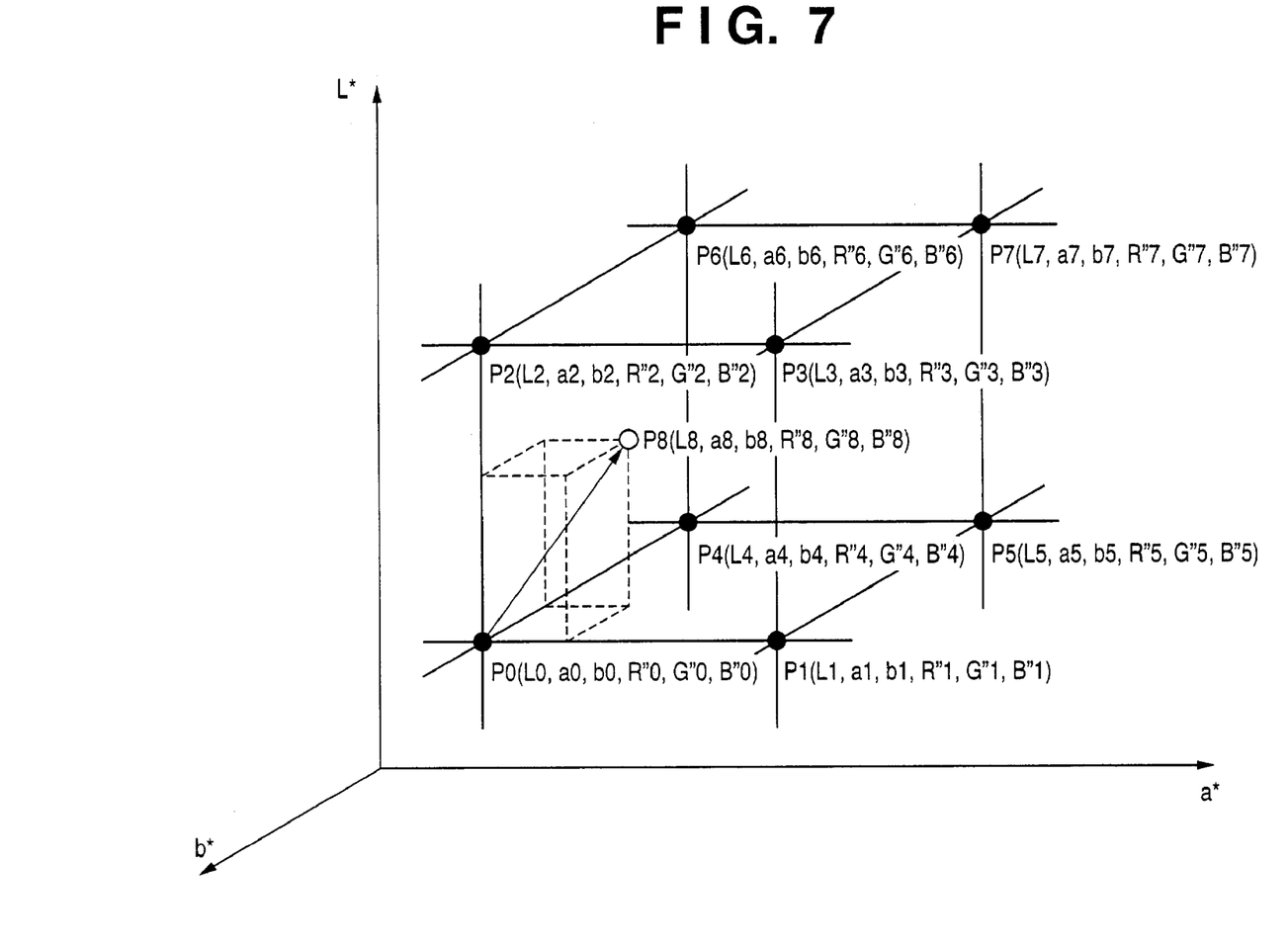
FIG. 7 is a diagram useful in describing an algorithm for correcting a gray line.

FIG. 7 is a diagram useful in describing an algorithm for correcting a gray line.

In FIG. 7, points P0 to P7 indicate the manner in which gray-line target values corresponding to the R"G"B" data and stored in the reference table 113 and the results of previously printing and measuring the colors in the vicinity thereof are plotted in L*a*b* color space of CIE.

Further, a point P8 is obtained by plotting grayline calorimetric values (L8,a8,b8) acquired as the result of printing and measuring the color of a patch based upon signal values (R",G",B") (=a2,a2,a2) of the gray line.

Indicated at each point are L*a*b* values representing the color at this point and R"G"B" values that are the basis of this point. For example, the values corresponding to the point P0 are L*a*b*=(L0,a0,b0) and R",G",B"=(R"0,G"0,B"9). It should be noted that R",G",B"=(R"8,G"8,B"8) at point P8 is obtained by interpolation from the R"G"B" values of points P0 to P7 in the vicinity of point P8.

Figure 8:
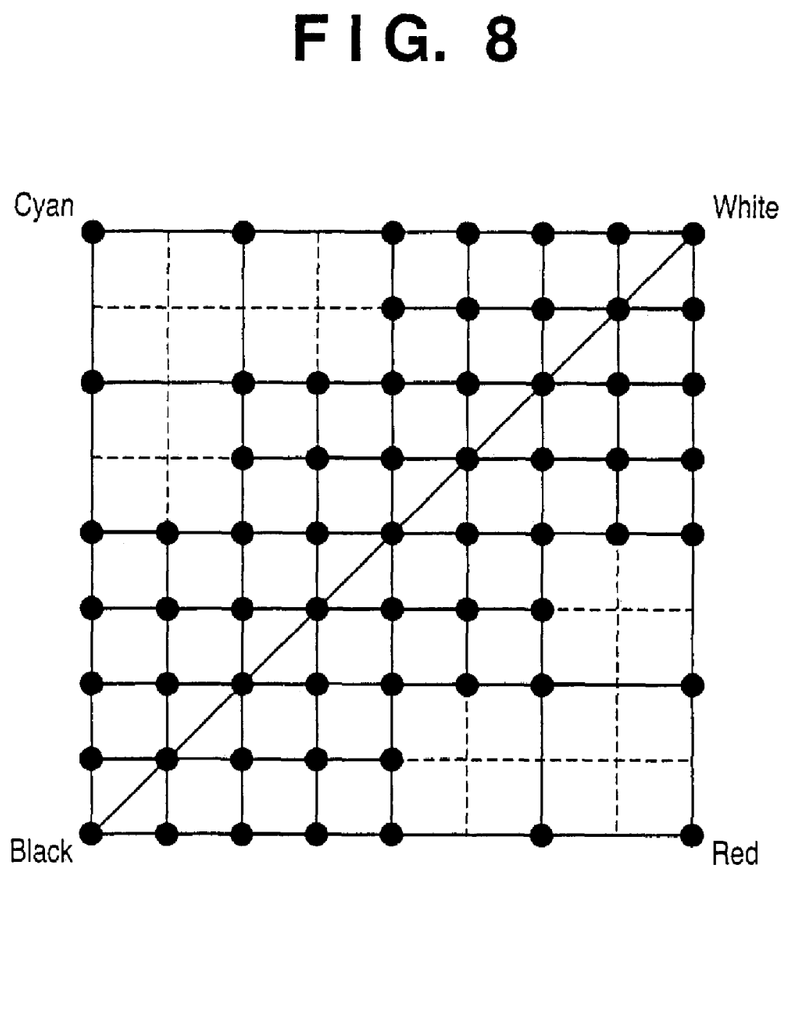
FIG. 8 is a diagram useful in describing a reference table.

FIG. 8 is a diagram useful in describing the reference table 113. The reference table 113 is the original three-dimensional table. In order to simplify the description, however, the gray line connecting the white and black points is represented in FIG. 8 by a cross section (two dimensions) passing through red and cyan.

It should be apparent from FIG. 8 that according to this method of constructing the table, the grid spacing is made finer in the vicinity of the gray line while the grid spacing in the area remote from the gray line is made coarser. Thus the table is so designed as to raise the color-reproduction precision in the vicinity of the gray line in a table of the same size.

Accordingly, as a result of colorimetry of gray-line signal values (R",G",B")=(a2,a2,a2), the color difference ΔE is expressed by the following equation, where P0 represents the target value of point P8:

$$\Delta E = \sqrt{[(L0-L8)^2 + (a0-a8)^2 + (b0-b8)^2]}$$

If it is determined at step S305 that the color difference ΔE exceeds the tolerance ϵ, (R"G"B")=(β2r,β2b,β2g) shown in FIG. 6 is calculated as ind by the following equations from the differences between the target R"G"B" values (R"0,G"0,B"0) and R"G"B" values (R"8,G"8,B"8), the latter of which are based upon the colorimetry values (L8,a8,b8):

$$\beta 2r = \alpha 2 + (R''0 - R''8)$$

$$\beta 2g = \alpha 2 + (G''0 - G''8)$$

$$\beta 2b = \alpha 2 + (B''0 - B''8)$$

Of course, the signal values of the gray line can be revised, in a manner similar to that described above, with regard to the input values a1 and a3 shown in FIG. 6.

The color reproduction characteristic of the gray line can be stabilized by the above calibration processing even in a case where the printing characteristic of the color printer 203 fluctuates. Furthermore, with regard to peripheral colors other than the gray line, an excellent color reproduction characteristic can be achieved if the 3D calibration table 108 is updated by performing a revision using three-dimensional interpolation that is based upon the calibrated gray line.

Thus, by updating the content of the 3D calibration table 108 of the 3D calibration unit (3D LUT) 102 disposed between the color matching unit 101 and the color decomposing processor 103, the tint of a printout can be stabilized in simple fashion for second- or higher-order colors without requiring limitation of the overall amount of ink in a case where the content of the color decomposition table 109 is changed, and without requiring complicated control of a six-color ink system or the like.

Further, in this embodiment, the color sensor 114 for measuring tint is provided within the color printer 203. As a result, it is unnecessary to separately provide a calorimeter or the like for measuring the tint of the color patches 205, and the tint of second-order and higher colors can be stabilized automatically and in real time without labor being spent on colorimetry. It goes without saying that the color printer 203 may be a printer that uses any type of printing method, such as an ink-jet printer or electrophotographic printer.

[Modification]

The above embodiment has been described with regard to an example in which the 3D calibration unit 102 is provided between the color matching unit 101 and color decomposing processor 103 and a three-dimensional calibration is carried out based upon the content of the 3D calibration table 108. However, a three-dimensional calibration using a 3D calibration table is not limited to that described above.

Figure 9:
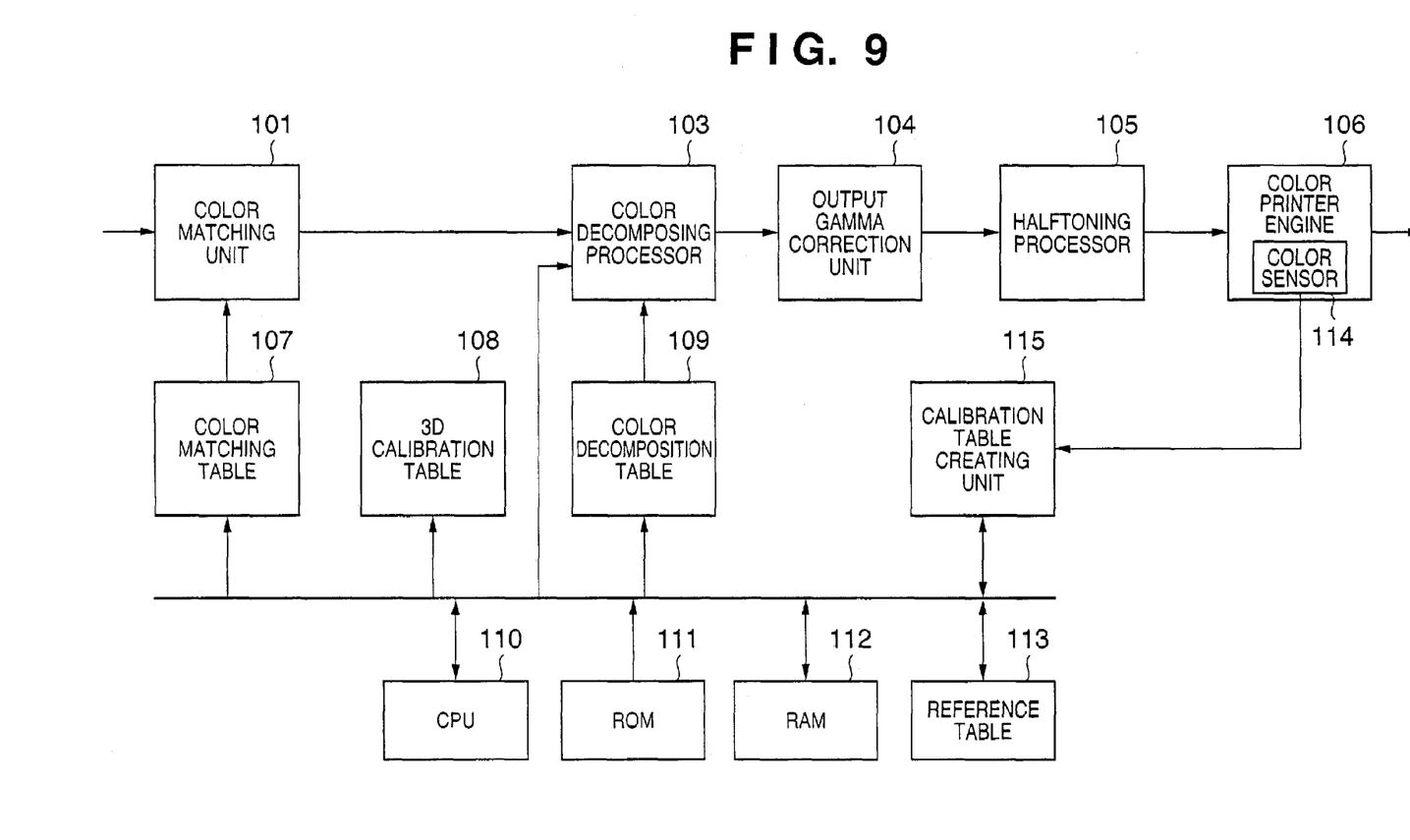
FIG. 9 is a block diagram illustrating another structure of an image processing apparatus according to a modification.

FIG. 9 is a block diagram illustrating the structure of an image processing apparatus in which the color matching unit 101 and color decomposing processor 103 are connected directly connected to each other.

In the arrangement of FIG. 9, the color matching table 107 and 3D calibration table 108 are combined and the color matching table 107 is updated by the table that results from the combination. Alternatively, the 3D calibration table 108 and color decomposition table 109 are combined and the color decomposition table 109 is updated by the table that results from the combination. As a result, processing equivalent to that of the above embodiment can be achieved.

Of course, the three tables consisting of the color matching table 107, 3D calibration table 108 and color decomposition table 109 can be combined and processing equivalent to that of the above embodiment can be achieved by three-dimensional interpolation processing using the three-dimensional table that results from the combination.

The above embodiment has been described with regard to an example in which, after the gray line is revised, the 3D calibration table 108 is created based upon the revised gray line. However, the method of creating the 3D calibration table 108 is not limited to the above. Besides the gray line, a white-red-black line, for example, or a color such as skin color whose calibration is desired, can be revised, and the revised line or color may be incorporated to create the 3D calibration table 108.

Further, it can make that the image processing apparatus has various calibration modes such as (i) a mode which calibrates the gray line, and (ii) a mode which calibrates both the gray line and a flesh color so that a user, who wants to shorten the calibration time, can choose the mode.

Note that in a case where the computer 201 and the color printer 203 are connected through the network, it can think that there is the color printer 203 in the remote place to the computer 201. Therefore, it is convenient that a status of the color printer 203 is returned from the color printer 203 to the computer 201 after the calibration is instructed by the computer 201.

For example, the computer 201 displays a status of the color printer 203 to the monitor 202, when a response has been received from the color printer 203. Note that the response indicates the status such as (i) forming patches, (ii) performing calorimetric by the sensor of the color printer 203, (iii) generating a color table by using the calorimetric values obtained in the step (ii), and (iv) the end of calibration. In this case the color printer 203 can be used by other user, and therefore, it is desirable with the color printer 203 to send information, which indicates the above status of the color printer 203, to other computers so as to inform the above status to a user of the other computer who tries to use the color printer 203. According to the above structure, it is possible to inform a processing state of the color sensor in the color printer 203 to the computers as the status.

[Other Embodiment]

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
   a converter, arranged to convert color of image data that is not used for a print, using a first multi-dimensional table, which is a multi-dimensional table for calibration;
   a decomposition section, arranged to decompose the converted image data into color signals for the print using a second multi-dimensional table, which is a multi-dimensional table for decomposition;
   a forming section, arranged to form color patches corresponding to signal values of target colors in the calibration;
   a sensor, arranged to measure colorimetric values of the formed color patches; and
   a generator, arranged to re-generate the first multi-dimensional table for calibration in accordance with the measured colorimetric values, and target values corresponding to the signal values of the target colors.

2. The apparatus according to claim 1, further comprising:
   a corrector, arranged to correct the signal values in accordance with comparison between the measured colorimetric values and the target values; and
   a controller, arranged to control correction by said corrector, and formation of the color patches corresponding to the corrected signal values.

3. The apparatus according to claim 2, wherein said corrector calculates signal values corresponding to the measured colorimetric values, and corrects the signal values of the target colors based on the calculated signal values.

4. The apparatus according to claim 2, wherein said forming section and corrector perform a process corresponding to the color patches of a gray line, and said generator generates the first multi-dimensional table to be used in the calibration of colors on the gray line and outside of the gray line in accordance with the measured colorimetric values of the color patches of the gray line.

5. The apparatus according to claim 1, further comprising a synthesizer, arranged to synthesize the first multi-dimensional table for the calibration and a multi-dimensional table for color matching.

6. The apparatus according to claim 1, further comprising a synthesizer, arranged to synthesize the first multi-dimensional table for the calibration and the second multi-dimensional table for the decomposition.

7. The apparatus according to claim 1, wherein the signal values of the target colors are signal values of colors on a gray line, and color reproduction of the gray line is stabilized by the calibration.

8. The apparatus according to claim 1, further comprising an information section arranged to inform a computer connected through a network that at least one of the forming by said forming section, the measurement by said sensor, and the re-generation of the first multi-dimensional table by said generator is performed.

9. An image processing method comprising the steps of:
   converting color of image data that is not used for a print, using a first multi-dimensional table, which is a multi-dimensional table for calibration;
   decomposing the converted image data into color signals for print using a second multi-dimensional table, which is a multi-dimensional table for decomposition;
   forming color patches corresponding to signal values of target colors in the calibration;
   measuring colorimetric values of the formed color patches; and
   re-generating the first multi-dimensional table for calibration in accordance with the measured colorimetric values, and target values corresponding to the signal values of the target colors.

10. The method according to claim 9, further comprising the steps of:
    correcting the signal values in accordance with comparison between the measured colorimetric values and the target values; and
    controlling correction in the correcting step, and formation of the color patches corresponding to the corrected signal values.

11. The method according to claim 9, further comprising the step of synthesizing the first multi-dimensional table for the calibration and a multi-dimensional table for color matching.

12. The method according to claim 9, further comprising the step of synthesizing the first multi-dimensional table for the calibration and the second multi-dimensional table for the decomposition.

13. The method according to claim 9, further comprising the step of informing a computer connected through a network that at least one of the forming in said forming step, the measurement in said sensing step, and the re-generation of the first multi-dimensional table in said generating step, is performed.

14. A computer-readable medium encoding a computer program comprising program code for an image processing method, the method comprising the steps of:
    converting color of image data that is not used for a print, using a first multi-dimensional table, which is a multi-dimensional table for calibration;
    decomposing the converted image data into color signals for the print using a second multi-dimensional table, which is a multi-dimensional table for decomposition;
    forming color patches corresponding to signal values of target colors in the calibration;
    measuring colorimetric values of the formed color patches; and
    re-generating the first multi-dimensional table for calibration in accordance with the measured colorimetric values, and target values corresponding to the signal values of the target colors.

* * * * *